T. B. JEFFERY, DEC'D.
K. E., O. T. & H. W. JEFFERY, EXECUTORS.
SAFETY ATTACHMENT FOR AUTOMOBILES.
APPLICATION FILED DEC. 30, 1909.
1,026,168.
Patented May 14, 1912.
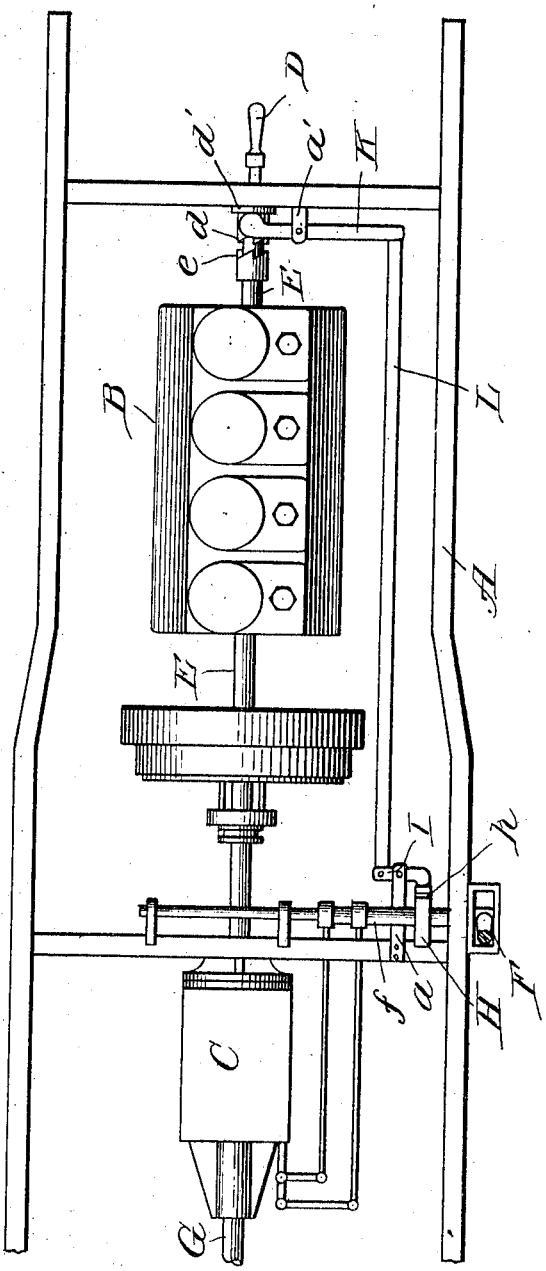
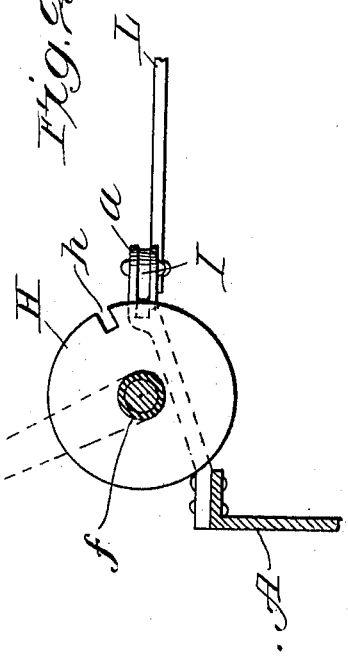
Witnesses:
Harry S. Gaither
Ruby V. Brydges
Inventor:
Thomas B. Jeffery
By Chamberlin Freudenreich
attys

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

SAFETY ATTACHMENT FOR AUTOMOBILES.

1,026,168.  Specification of Letters Patent.  Patented May 14, 1912.

Application filed December 30, 1909. Serial No. 535,605.

*To all whom it may concern:*

Be it known that I, THOMAS B. JEFFERY, a citizen of the United States, residing at Kenosha, county of Kenosha, State of Wisconsin, have invented a certain new and useful Improvement in Safety Attachments for Automobiles, and declare the following to be a full, clear, and exact description of the same, such as will enable others skilled in the art to which it pertains to make and use the same, reference being had to the accompanying drawings, which form a part of this specification.

Before cranking an automobile engine it is always the intention of the operator to have the condition of the machinery such that the automobile will not start as soon as the engine begins to operate. However, through accident or carelessness, it sometimes happens that the controlling mechanism is left in a position wherein the engine is connected to the driving wheels so that the automobile will begin to move as soon as the engine starts, thereby making the position of the person who is cranking an extremely dangerous one.

The object of the present invention is to provide a safety device so that it is impossible for the engine to start unless it is disconnected from the driving wheels of the automobile.

The various features of novelty whereby my invention is characterized will hereinafter be pointed out with particularity in the claim; but for a full understanding of my invention and of its object and advantages, reference may be had to the following detailed description taken in connection with the accompanying drawing, wherein:

Figure 1 is a plan view of the front portion of the frame or chassis of an automobile which is equipped in accordance with one form of my invention; and Fig. 2 is a side view on an enlarged scale showing a fragment of the safety device.

Referring to the drawing, A represents the frame of an automobile, B the engine, C the speed changing gearing, and D a starting crank. These parts may take any usual or preferred forms. In the arrangement shown the crank is of the type which has a series of ratchet teeth $d$ which are adapted to mesh with similar teeth $e$ on the engine shaft E. Normally the two sets of ratchet teeth are out of engagement with each other but when it is desired to crank the engine the crank is forced inwardly to cause the teeth to intermesh.

F is a controlling lever for the speed changing gears, this mechanism being intended to represent that type wherein, when the lever is in the neutral position, the engine shaft is disconnected from the transmission shaft G.

In accordance with my invention I provide means arranged between the starting crank and the controlling lever for preventing the starting crank from being carried into operative relation with the engine shaft unless the controlling lever is in the neutral position, that is, the position wherein a rotation of the engine shaft is not transmitted to the driving shaft G. Consequently if the controlling lever is left in any position other than neutral and the operator attempts to crank the engine, he will be prevented from setting the engine in rotation and will be protected from injury due to starting of the automobile while he is cranking. It will, of course, be understood that this safety mechanism may take various forms and that that illustrated is simply one of such forms. In the arrangement shown I have provided the shaft $f$, to which the controlling lever is connected, with a segment H having therein a notch $h$.

I is a lever pivoted upon a bracket $a$ supported from the frame in a position wherein one end is adapted to engage with the periphery of the segment.

K is a lever which is pivoted upon a suitable fixed support, as at $a^1$, near the crank shaft and has one end projecting behind a collar $d^1$ on the crank shaft. The other end of the lever K is connected to one arm of the lever I by means of a rod L. The arrangement is such that a movement of the free end of the lever K toward the rear produces a corresponding movement of that end of the lever I which engages with the segment. The parts are also so proportioned that when the lever I engages with the segment at any other point than when it is seated in the notch $h$ the free end of the lever K is unable to move backward far enough to permit the teeth on the crank shaft to mesh with the teeth on the shaft of the engine. When the controlling lever F occupies the neutral position the notch $h$ is adapted to lie directly behind the free end of the lever I from I and the notch is deep enough to permit the connected levers to oscillate sufficiently to enable the teeth on the crank handle to be brought into mesh with those on the engine shaft. In other words it is impossible to crank the engine unless the controlling lever F is in the position wherein it prevents the automobile from starting with the engine.

While I have described in detail only a single embodiment of my invention, I do not desire to be limited to the structural details described, but intend to cover all forms and arrangements which fall within the terms employed in the definitions of my invention constituting the appended claim.

What I claim is:

In an automobile having an engine and a controlling lever, a starting crank for the engine movable between an operative position and an idle position, a pivoted lever having one end projecting into proximity to said starting crank and movable between positions corresponding to the two positions of the crank, a disk movable with the controlling lever, said disk having a notch in its periphery, and means extending from the other end of said lever into proximity to said disk, the parts being so proportioned and arranged that the disk locks said lever in the position to hold the crank in its inoperative position except when the notch in the disk occupies a predetermined position.

In testimony whereof, I sign this specification in the presence of two witnesses.

THOMAS B. JEFFERY.

Witnesses:
WM. F. FREUDENREICH,
RUBY V. BRYDGES.

---

Copies of this patent may be obtained for five cents each, by addressing the "Commissioner of Patents, Washington, D. C."